Nov. 9, 1965  A. E. NEUMILLER  3,216,670
BOW AND ARROW FISHING EQUIPMENT
Filed Oct. 21, 1959

INVENTOR.
ARTHUR E. NEUMILLER

United States Patent Office 3,216,670
Patented Nov. 9, 1965

3,216,670
BOW AND ARROW FISHING EQUIPMENT
Arthur E. Neumiller, Bennington, Nebr.
Filed Oct. 21, 1959, Ser. No. 847,830
1 Claim. (Cl. 242—85.1)

This invention relates to fishing tackle, particularly of the type used in spear fishing, and in particular a line holder designed to be mounted on a bow, and a spear or arrow attached to one end of a line wrapped over the holder, and positioned with the opposite end of the line secured to the bow.

I am aware that spools have been attached to bows, such spools having a tapered construction so that line can be wound around them with the tapered construction facilitating the paying out of the line as the arrow is shot.

However, such spools have had the disadvantage, first of all, of back-lash. When the line becomes entangled as it so easily does because of the high speed of the arrow and because of knots or kinks in the line, and further because of various over-lapping of the several loops of the line in various unevenly wound ways, back-lash often occurs. Such back-lashings are very dangerous where an arrow is involved as when the string becomes taut, the arrow snaps back at the archer.

Moreover, during the back-lash the arrows flying back at the archer almost always come back point-first because the jerk itself is applied to the back end of the arrow, and as an arrow never is shooting out in exactly a straight line from the reel, inevitably, the arrow will flip whereby it is the point of the arrow which is coming back at the archer.

A further disadvantage of back-lash is, of course, in the frustration involved in disentangling the line and in the loss of the opportunity of hitting a fish which, in some cases, can be a rare opportunity.

Spools tend to backlash, partly because the line is ordinarily wrapped on a surface which is smooth and not provided with a particular groove to fit each loop and it is an object of my invention to provide a particular notch in each end of my line-holder to fit each loop of the line.

A further disadvantage of many spool-type arrow fishing devices is in the fact that the line must pay out in passing over either the other line wound on the spool, or over an upstanding edge of the spool, either one of which produce a considerable drag on the line as can slow down the speed of an arrow greatly, or deflect the arrow from the target with consequent loss of the fish.

It is therefore an object of my invention to provide a string winding holder having no impediment in the way of the line as it pays out that is substantial enough to materially interfere with the fast accurate flight of the arrow. While the notches for receiving the loops of the line of my holder, are concave and are higher on the pay-out side of the notch, nevertheless, there are only two such notches per each complete loop and even these two notches can be rounded.

It is also an object to provide a holder which is provided with ends sufficiently spaced as to hold loops of much more substantail size than reel-type holders. This has the result that the size of the impediment of each notch of my holder is very minute in proportion to the size of the loop involved whereby no substantial impediment to the paying out of the line is experienced.

I am aware that others have proposed fishline drying devices, the ends of which have been spaced considerable distances apart in order to make it possible the winding of large loops. However, such devices have line-holding surfaces that do not generally taper and wider loops at one side to smaller loops at the other side as it is an object of my invention to provide, whereby the first loop staying out will not interfere with later loops. In comparison, a further object of my invention is to provide a line holder the ends of which are notched as is not generally the case on fishline drying devices, these notches being very important for preventing the line from falling off the holder during the long periods of walking around in the water waiting for an opportunity to shoot.

A further object of my invention is to provide a large loop holder in which if the loops of the line are bumped toward one another, they will not tend to come off of the holder or tangle or bind up on one another because it is an object of my invention to provide notches in the ends of the holder for individually holding each loop to prevent this.

It is common for a line which has been used on a bow for even a short length of time to have acquired knots in it. When such a line is used on a reel-type or spool-type holder, there usually is an edge of the spool over which the line must pass and knots tend to catch on this edge thereby not only slowing down the arrow, but as is even more important, destroying the accuracy of the shot. It is therefore an object of my invention to provide for the first time, a large loop holder providing only very small areas in engagement with each loop whereby the difficulty to be experienced from knots in the line is tremendously reduced, and in fact, it is my experience that there is no interference at all on my holder to be had from knots in the line.

A particular objective is to provide a line-holder with the features described which is thin and of much lesser dimension in a direction transverse to its elongated notched arrow line holding surfaces so that it provides a minimum of interference with the archer's vision. In this way being distinguished from reels of a circular type common to the prior art. I believe it to be much better that the line-holder lay in a plane almost parallel to and adjacent to the bow for a minimum of interference with visibility.

A further object of the invention is to provide a line holder for a bow and arrow in which a catch is provided for retaining the line in a cocked position.

A still further object of the invention is to provide a retrieving line holder for a bow and arrow in which the holder is of simple and economical construction.

With these and other objects and advantages in view the invention embodies a pair of horns having converging stepped outer surfaces, and means for mounting the horns on a side of a bow whereby a line wrapped on the horns with one end attached to an arrow and the other to the bow pays outwardly without becoming entangled as the arrow is projected by the bow.

Other features and advantages of the invention will appear from the following description taken in connection with the drawings, wherein.

Figures 1, 2, 3:
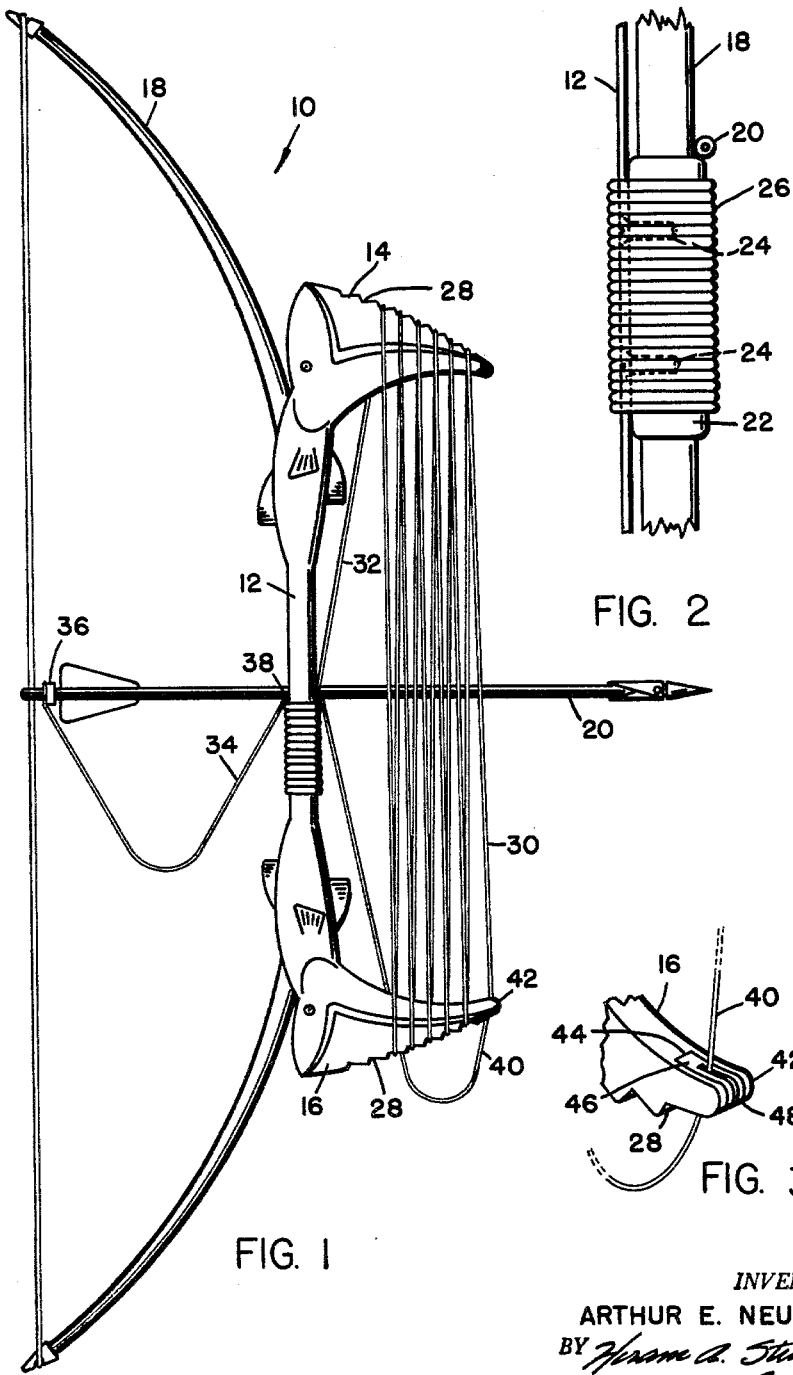
FIGURE 1 is a side elevational view of a bow with a retrieving line holder positioned on one side thereof and with a line on the holder and an arrow in the shooting position on the bow.
FIGURE 2 is a front elevational view showing the mounting of the holder on a bow with upper and lower ends of the bow broken away, and with the parts on an enlarged scale.
FIGURE 3 is a view showing the tip of one of the horns of the holder with the parts shown on an enlarged scale, and illustrating a catch for retaining a retrieving line on the holder.

While one embodiment of the invention is illustrated in the above referred to drawings, it is to be understood that they are merely for the purpose of illustration and that various changes in construction may be resorted to in the course of manufacture in order that the invention may be utilized to the best advantage according to circumstances which may arise, without in any way departing from the spirit and intention of the device, which is to be limited only in accordance with the appended claims. And while there is stated the primary field of utility of the invention it remains obvious that it may be employed in any other capacity wherein it may be found applicable.

In the accompanying drawings, and in the following specification, the same reference characters are used to designate the same parts and elements throughout and in which the numeral 10, refers to the invention in its entirety, numeral 12 indicating a bar having horns 14 and 16 on the ends, numeral 18 a bow on which the bar and horns are positioned, and numeral 20 an arrow.

The bar 12 is positioned on one side of the grip 22 of the bow, and the bar is secured in position by screws 24 extended through the bar and threaded in the bow. The bar may also be secured by tape 26 which is wrapped around the bar and bow, and the tape may be of leather, or other suitable material to enhance gripping.

The outer surfaces of the horns are provided with corrugations or steps 28 to facilitate wrapping a fishing line 30 on the horns, and to prevent slippage of layers on the fishing line on the horns as the line pays out.

One end 32 of the line is attached to the bow, and the opposite end 34 is connected to the arrow at the point 36. The end 34 of the line is held with the arrow at the point 38, and from the point 38 the line drops downwardly forming a loop 40. From the loop 40 the line extends through the tip of the lower horn and passes upwardly over the small end of the upper horn 14, and from this point the line is wrapped progressively over the steps or corrugations of the horns, as shown.

The lower horn 16 is provided with a bifurcated tip 42 providing a slot 44, and a sponge or soft rubber insert 46 having a slit 48 therein is positioned in the slot. After wrapping the line on the horns the line is inserted in the slit 48 whereby the line is retained in tension on the horns until the arrow is projected. Sufficient slack is provided in the line between the catch in the tip of the lower horn and the inner end of the arrow to permit the arrow to be drawn to the rear for firing.

In the design shown the bar is patterned to represent fish with the heads extended outwardly, and the horns are represented by shells secured to the heads of the fish.

With the parts formed as illustrated and described, and with the arrow in the cocked position shown in FIGURE 1, the arrow is drawn rearwardly and released, drawing the line from the catch. The line pays outwardly from the small ends of the horns with the line of each step paying outwardly before the line of the following step starts. By this means the possibility of entangling the line is obviated and all interference with the travel of the arrow is eliminated. After retrieving the arrow with a fish thereon the line is wrapped on the horns in stages, as shown in the drawing.

From the foregoing specification it will become apparent that the invention disclosed will adequately accomplish the functions for which it has been designed and in an economical manner and that its simplicity, accuracy and ease of operation are such as to provide a relatively inexpensive device considering what it will accomplish and that it will find an important place in the art to which it appertains when once placed on the market.

It is thought that persons skilled in the art to which the invention relates will be able to obtain a clear understanding of the invention after considering the description in connection with the drawings. Therefore, a more lengthly description is regarded as unnecessary.

Changes in shape, size and rearrangement of details and parts such as come within the purview of the invention claimed may be resorted, in actual practice if desired.

Having now described the invention that which is claimed to be new and desired to be procured by Letters Patent, is:

An elongated line-holder for a bow having spaced end portions provided with outer edges disposed generally transversely to the length of said line-holder, said outer edges generally converging at their forward ends, a plurality of notches arranged in a row on each of said outer edges, said notches each being adapted to receive one end of an elongated loop of an arrow holding-line, said notches being sufficiently shallow so as to permit the ready pay out of said line during shooting, said holder being relatively thin in a direction transverse to said outer edges in proportion to its length, whereby portions of the line extended between said spaced end portions lie substantially in a straight line whereby they can be in alignment with a bow for not interferring with maximum visibility by an archer, said outer edges having portions defining the bottoms of said notches, each of said portions being disposed at a greater distance from the other spaced end portions progressively from the forward end of an end portion to the rearward end thereof, whereby each row of notches inclines from a forward end to a rearward end.

References Cited by the Examiner
UNITED STATES PATENTS

| | | | |
|---|---|---|---|
| 736,051 | 8/03 | Adams | 124—24 |
| 1,859,842 | 5/32 | Radford | 242—125.2 |
| 2,537,613 | 1/51 | Allen. | |
| 2,550,791 | 5/51 | English | 242—85.1 |
| 2,747,812 | 5/56 | Lassen | 242—85.1 |
| 2,873,929 | 2/59 | Meyer et al. | 242—85.1 |
| 2,896,872 | 7/59 | Dresser | 242—61 |

MARVIN STEIN, *Primary Examiner.*

HARRISON R. MOSELEY, RUSSELL C. MADER, *Examiners.*